United States Patent
Nakayoshi et al.

(10) Patent No.: US 7,074,849 B2
(45) Date of Patent: Jul. 11, 2006

(54) SILVER-FILLED ELECTRICALLY CONDUCTIVE ORGANOSILOXANE COMPOSITIONS

(75) Inventors: Kazumi Nakayoshi, Chiba Prefecture (JP); Katsutoshi Mine, Chiba Prefecture (JP); Rikako Tazawa, Chiba Prefecture (JP)

(73) Assignee: Dow Corning Corporation, Midland, MI (US)

( * ) Notice: Subject to any disclaimer, the term of this patent is extended or adjusted under 35 U.S.C. 154(b) by 125 days.

(21) Appl. No.: 10/822,888

(22) Filed: Apr. 13, 2004

(65) Prior Publication Data

US 2004/0192834 A1    Sep. 30, 2004

Related U.S. Application Data

(60) Division of application No. 10/052,760, filed on Jan. 18, 2002, now Pat. No. 6,797,772, which is a continuation of application No. 08/722,733, filed on Oct. 1, 1996, now abandoned, which is a continuation of application No. 08/318,459, filed on Oct. 5, 1994, now abandoned.

(30) Foreign Application Priority Data

| Oct. 6, 1993 | (JP) | ................................. 5-274892 |
| Oct. 6, 1993 | (JP) | ................................. 5-274893 |
| Nov. 17, 1993 | (JP) | ................................. 5-311265 |

(51) Int. Cl.
  *B05D 3/02*    (2006.01)
  *C08K 9/06*    (2006.01)
  *C08L 83/05*   (2006.01)
  *C08L 83/06*   (2006.01)
  *C08L 83/07*   (2006.01)

(52) U.S. Cl. ........................ 524/588; 427/387; 525/478

(58) Field of Classification Search ..................... None
See application file for complete search history.

(56) References Cited

U.S. PATENT DOCUMENTS

| 4,801,445 A | * | 1/1989 | Fukui et al. ................... 424/69 |
| 5,075,038 A | * | 12/1991 | Cole et al. .................... 252/514 |
| 5,173,765 A | * | 12/1992 | Nakayoshi et al. ......... 257/783 |
| 5,344,593 A | * | 9/1994 | Chiba et al. ................ 252/514 |
| 5,384,075 A | * | 1/1995 | Okami ....................... 252/511 |
| 5,804,631 A | * | 9/1998 | Mine et al. .................. 524/440 |
| 5,872,170 A | * | 2/1999 | Mine et al. .................. 524/440 |
| 6,017,587 A | * | 1/2000 | Kleyer et al. ................ 427/387 |
| 6,797,772 B1 | * | 9/2004 | Nakayoshi et al. ......... 524/731 |

FOREIGN PATENT DOCUMENTS

| JP | 01249880 A | * | 10/1989 |
| JP | 04046962 A | * | 2/1992 |

* cited by examiner

*Primary Examiner*—Robert Sellers
(74) *Attorney, Agent, or Firm*—Catherine Brown

(57) ABSTRACT

The electrical properties, particularly contact resistance and volume resistivity, of materials prepared by curing organosiloxane compositions containing finely divided silver as the electroconductive filler are improved by treating the silver particles with an organosilicon compound prior to incorporating the particles into the organosiloxane composition.

11 Claims, No Drawings

SILVER-FILLED ELECTRICALLY CONDUCTIVE ORGANOSILOXANE COMPOSITIONS

CROSS REFERENCE TO RELATED APPLICATIONS

This application is a divisional of U.S. Pat. No. 6,797,772 corresponding to U.S. Ser. No. 10/052,760 filed 18 Jan. 2002 18 Jan. 2002 and issued on Sep. 9, 2004, which is a continuation of U.S. patent application Ser. No. 08/722,733 filed Oct. 1, 1996 now abandoned, which is a continuation of U.S. patent application Ser. No. 08/318,459 filed Oct. 5, 1994 now abandoned. This application claims priority to U.S. Pat. No. 6,797,772 corresponding to U.S. patent application Ser. No. 10/052,760, U.S. patent application Ser. No. 08/722,733, and U.S. patent application Ser. No. 08/318,459 under 35 U.S.C. §120.

TECHNICAL FIELD

This invention relates to electrically conductive organosiloxane elastomers. More particularly, this invention relates to storage-stable, silver-filled organosiloxane compositions yielding cured electrically conductive elastomers that retain their electrical properties for extended periods of time. The reduced variation of contact resistance and volume resistivity with time exhibited by the elastomers are attributed to the manner in which the silver particles are processed prior to being incorporated into the curable organosiloxane composition.

BACKGROUND

Elastomers, gels and resins prepared from curable organosiloxane compositions containing finely divided silver particles exhibit high levels of electrical conductivity and are therefore used in specialized applications that require materials exhibiting heat resistance, flex resistance, and electrical conductivity.

Japanese Patent Application Laid Open [Kokai or Unexamined] Number Hei 3-170,581 [170,581/1991] teaches an electrically conductive silicone rubber composition comprising an organopolysiloxane containing at least 2 alkenyl radicals in each molecule, an organohydrogensiloxane containing at least 2 silicon-bonded hydrogen atoms in each molecule, a platinum-containing hydrosilylation catalyst, and silver particles.

The silver particles used to prepare electrically conductive silicone rubber are typically classified as chemically reduced silver, electrolytically reduced, and atomized silver. Chemically reduced silver is prepared by reacting an aqueous silver nitrate solution with a reducing agent such as hydrazine, formaldehyde or ascorbic acid. Electrolytically reduced silver is prepared from aqueous silver nitrate solutions by electrolytic deposition at the cathode. Atomized silver particles are prepared by spraying molten silver maintained at a temperature of at least 1,000° C. into water or an inert gas.

Silver particles are available in the form of granules, flakes, dendrites or amorphous particles. Silver flake is preferably used because it yields silicone rubbers with particularly high electrical conductivities.

Japanese Laid Open Patent Application No. 59/170,167 discloses a method for preparing gold- or silver-filled inks by blending an organic solvent with a powdered form of gold or silver that has been treated with the combination of a methylhydrogen polysiloxane and an amino-functional silicone oil.

U.S. Pat. No. 5,227,093, which issued on Jul. 13, 1993 teaches increasing the electrical conductivity of elastomers and other products prepared from curable organosiloxane compositions containing finely divided silver particles by treating the silver particles with a fatty acid ester prior to blending the sivler particles with the other ingrediets of the curable composition.

Japanese Laid Open Patent Application No. 03/49,105 describes electrically conductive particles suitable for use with adhesives. The particles exhibit diameters of from 1 to 20 microns and comprise a core of a high polymer on which is deposited a layer of silver followed by a layer of gold. During blending with the ingredients of a curable organosiloxane composition the particles are treated with a silane coupling agent selected from the group consisting of gamma-methacryloxypropyltrimethoxysilane, gamma-mercaptopropyltrimethoxysilane and gamma-chloropropyltrimethoxysilane.

Several problems are associated with the electrically conductive silicone rubber compositions taught in Japanese Patent Application Laid Open No. Hei 3-170,581 and the other publications mentioned in the immediately preceding paragraphs. When silver in flake-form is used as a filler, it has been found that during storage of the composition not only do the silver particles separate from the composition, but the curability of the composition declines with the passage of time to the point that the composition ultimately becomes uncurable.

Another problem associated with the prior art conductive silicone rubber compositions is the large variations in contact resistance and volume resistivity that occur with the passage of time in the cured elastomers prepared using the curable compositions described in this patent publication. This phenomenon renders the rubber unsuitable for the continuous electrical connection of electrically conductive elements.

The present inventors have been able to determine that one cause of the variation in electrical properties of silver-filled organosiloxane elastomers with time is the low affinity of silver particles for the other ingredients of the curable composition used to prepare the elastomer.

The present inventors have also been able to confirm that the curability of electrically conductive silicone rubber compositions declines with elapsed time due to the presence of residues of the lubricant that is present during grinding of the silver particles. These lubricant residues remain on the surface and/or in the interior of the particles.

One or more of the following lubricants typically have been used with silver particles during grinding of the particles: saturated and unsaturated higher fatty acids such as lauric acid, myristic acid, palmitic acid, stearic acid, oleic acid, arachidic acid, and behenic acid; metal soaps such as aluminum laurate, aluminum stearate, zinc laurate, and zinc stearate; higher aliphatic alcohols such as stearyl alcohol; the esters of higher aliphatic alcohols and carboxylic acids; higher aliphatic amines such as stearylamine; higher aliphatic amides; and polyethylene waxes.

The present inventors attempted to remove the lubricant on the surface of lubricant-treated silver flake by subjecting the silver particles to repeated washings with organic solvents. The washings did not provide a satisfactory suppression of the timewise variation in the curability of electrically conductive silicone rubber compositions containing this type of silver as a conductive filler.

The present inventors have also confirmed that a decline in adhesion and affinity between the cured silicone elastomer and the silver particles contribute to timewise variations in, respectively, the contact resistance and volume resistivity of electrically conductive silicone rubbers prepared by curing silver-filled electrically conductive silicone rubber compositions.

As the result of extensive investigations directed at solving the problems described in the preceding paragraphs of this specification, the present inventors discovered that the timewise variation in curability can be suppressed by treating the finely divided silver particles with an organosilicon compound prior to combining the particles with the other ingredients of the curable organosiloxane composition.

The present inventors also discoverd that the presence in the curable organosiloxane compostion of an organosilicon compound containing silicon-bonded alkoxy groups that is in addition to the compound used to treat the silver particles, further reduces the timewise variations in contact resistance and volume resistivity of the cured elastomer. The present invention is the result of these two discoveries.

SUMMARY OF THE INVENTION

The objectives of the present invention can be achieved by pretreating the silver particles intended for use in the present organosiloxane compositions with an organosilicon compound prior to combining the particles with the other ingredients of these compositions.

The variation in electrical properties with time exhibited by our curable composition is can be further reduced by the presence in the curable composition of an alkoxy-containing organosilicon compound as an additive. This compound is in addition to any used as the organosilicon compound for treatment of the silver particles. An organohydrogensiloxane containing alkoxy groups will function both as this additive and the curing agent for the organosiloxane composition, or an organohydrogensiloxane and an organosilicon compound containing silicon-bonded alkoxy groups can be added as separate ingredients.

DETAILED DESCRIPTION OF THE INVENTION

The present invention provides an improved electrically conductive silicone rubber composition comprising (A) 100 parts by weight of a polyorganosiloxane containing at least two alkenyl radicals per molecule, (B) an organohydrogensiloxane containing at least two silicon-bonded hydrogen atoms in each molecule, in a quantity sufficient to provide from 0.5 to 3 silicon-bonded hydrogen atoms per alkenyl radical present in said polyorganosiloxane, (C) from 50 to 2,000 parts by weight of finely divided silver particles, and (D) a platinum-containing hydrosilylation catalyst in a quantity sufficient to promote curing of said composition.

The improvement comprises treating the silver particles with an organosilicon compound selected from the group consisting of alkoxysilanes and organosiloxanes prior to combining the particles with the other ingredients of the present curable composition.

The variation in electrical properties with time of cured materials prepared using the present curable compositions can be reduced if the compositions contain up to 20 parts by weight of an organosilicon compound containing silicon-bonded alkoxy groups.

The Treated Silver Particles (Ingredient C)

The characterizing feature of the present curable organosiloxane compositions is the presence of silver particles that have been treated with an organosilicon compound prior to being combined with the other ingredients of the curable organosiloxane composition. In preferred embodiments, the organosilicon compound which is used to pre-treat the silver particles is selected from the group consisting of (i) silanes containing at least one alkoxy group and (ii) organosiloxanes.

The organosilicon compound used to treat the surface of the silver particles, referred to in this specification as ingredient C, is responsible for the electrical conductivity exhibited by silicone rubbers prepared by curing the present compositions, irrespective of the storage time of the curable composition used to prepare the elastomer.

The silver particles can be prepared by the chemical or electrolytic reduction of a silver compound such as silver nitrate, or by atomization of molten silver. The particles treated in accordance with the present invention can be 100 percent pure silver or a silver alloy. Useful silver alloys include silver/copper alloys and silver/palladium alloys. The silver alloys may also contain trace amounts of other metals such as zinc, tin, magnesium, and nickel.

With respect to non-metallic impurities on the surface of the treated particles, to avoid cure inhibition of the orgganosiloxane composition it is particularly preferred that the $NH_4^{+1}$ content not exceed 10 ppm and that the $SO_4^{-2}$ content not exceed 5 ppm.

While no specific restrictions apply to the diameter of the silver particles, average particle diameters in the range of from 0.1 to 10 micrometers are preferred. Because the morphology of ingredient C is likewise not critical, the particles can be in the form of granules, dendrites, flakes or the particles may be amorphous. Mixtures of silver particles exhibiting various morphologies can be used. The flake form of silver is preferred for the preparation of highly electrically conductive cured silicone elastomers.

The organosilicon compound used to treat the surface of the silver particles is not specifically restricted. Examples of suitable treating agents include but are not limited to:

alkoxysilanes such as methyltrimethoxysilane, vinyltrimethoxysilane, 3-glycidoxypropyltrimethoxysilane, 3-methacryloxypropyltrimethoxysilane, dimethyldimethoxysilane, trimethylmethoxysilane, trimethylethoxysilane, tetramethoxysilane, and tetraethoxysilane;

siloxane oligomers such as silanol-endblocked dimethylsiloxane oligomers, silanol-endblocked dimethylsiloxane/methylvinylsiloxane co-oligomers, silanol-endblocked methylvinylsiloxane oligomers, silanol-endblocked methylphenylsiloxane oligomers, 1,3,5,7-tetramethylcyclotetrasiloxane, and 1,3,5,7,9-pentamethylcyclopentasiloxane;

polyorganosiloxanes ranging from low-viscosity liquids to gums, and including but not limited to trimethylsiloxy-endblocked polydimethylsiloxanes, trimethylsiloxy-endblocked dimethylsiloxane/methylvinylsiloxane copolymers, trimethylsiloxy-endblocked dimethylsiloxane/methylphenylsiloxane copolymers, trimethylsiloxy-endblocked polymethylhydrogensiloxanes, trimethylsiloxy-endblocked dimethylsiloxane/methylhydrogensiloxane copolymers, silanol-endblocked polydimethylsiloxanes, silanol-endblocked dimethylsiloxane/methylvinylsiloxane copolymers, silanol-endblocked dimethylsiloxane/methylphenylsiloxane copolymers, silanol-endblocked polymethylhydrogensiloxanes, silanol-endblocked dimethylsiloxane/methylhydrogensiloxane copolymers, dimethylvinylsiloxy-endblocked polydimethylsiloxanes, dimethylvinylsiloxy-endblocked dimethylsiloxane/methylvinylsiloxane copolymers, dimethylvinylsiloxy-endblocked dimethylsiloxane/methylphenylsiloxane copolymers, dimethylhydrogensiloxy-endblocked polymethylhydrogensiloxanes, and dimethylhydrogensiloxy-endblocked dimethylsiloxane/methylhydrogensiloxane copolymers; and silicone resins, including but not limited to resins composed of $R_3SiO_{1/2}$ and $SiO_{4/2}$ units, silicone resins composed of the $RSiO_{3/2}$ unit, resins composed of the $R_2SiO_{2/2}$ and $RSiO_{3/2}$ units, and resins composed of the $R_2SiO_{2/2}$, $RSiO_{3/2}$, and $SiO_{4/2}$ units.

The organosilicon compounds used to treat the silver particles can be used singly or as mixtures of two or more compounds. The group represented by R in the units of the silicone resins represents any of the substituted and unsubstituted monovalent hydrocarbons discussed in the section of this specification relating to the alkenyl-containing polyorganosiloxane; referred to in this specification as ingredient A.

Silicone resins used as silver treating agents in accordance with the present invention are preferably solids that soften at above room temperature, most preferably within the range from 50° C. to 150° C.

The thickness of the coating of the organosilicon compound or a polycondensation product of this compound that is formed during treatment of the silver particles is not critical. The conductivity of cured silicone elastomers prepared from the filled silicone rubber compositions is typically inversely proportional to the thickness of the coating, however, thinner films reduce the affinity between the treated silver particles and the other ingredients of curable organosiloxane compositions, resulting in larger decreases with the passage of time in the curability of these compositions.

For these reasons, while the optimal coating thickness will be dependent upon the particular end-use application, thicknesses not exceeding 0.1 micrometer are preferred. In order to obtain highly electrically conductive cured silicone rubber, the excess organosilicon compound, or the polycondensation products of this compound, should be removed from the surface of the silver particles by washing the particles with a suitable organic solvent.

The method for treating the silver particles with the organosilicon compound is not critical. As an example, the surface of the silver particles can be wetted with the compound in the absence of any solvent or with a solution of a liquid or solid organosilicon compound in a suitable organic liquid.

The present treatment method is suitable for silver particles prepared by chemical or electrolytic reduction or by atomization or by other means for preparing finely divided particles from molten silver and its alloys.

Chemically reduced silver particles can be prepared, for example, by the reduction of an aqueous silver nitrate solution with a chemical reducing agent such as hydrazine, formaldehyde, or ascorbic acid.

Electrolytically reduced silver is in the form of dendrites that are deposited on a cathode during the electrolysis of an aqueous silver nitrate solution.

Atomized silver particles can be prepared by spraying molten silver heated to at least 1,000° C. into water or inert gas.

No specific restrictions apply to the technique for wetting the silver particles with the neat organosilicon compound or solutions of that compound in a suitable organic liquid. Suitable treatment techniques include but are not limited to spraying the silver particles with a neat or solubilized organosilicon compound, immersing the silver particles in a neat or solubilized organosilicon compound, and grinding the silver particles using the neat or solubilized organosilicon compound as a lubricant.

Methods involving grinding are preferred because they produce a flake form of silver that is particularly suitable for preparing highly electrically conductive silicone rubber. The grinding process yields particularly desirable results for the silver flake product. During grinding of silver particles, the organosilicon compound functions as a surface-treatment agent, and accelerates flake formation by becoming adsorbed onto the activated surface of the flakes, thereby inhibiting aggregation of flakes into larger particles.

The device for grinding the silver particles is not critical. Useful devices for this purpose include but are not limited to stamping mills, ball mills, vibratory mills, hammer mills, roll mills, and the combination of a mortar and pestle.

The conditions for milling the silver particles are not specifically restricted. The conditions will be dependent at least in part on the diameter and shape of the silver particles. Grinding is preferably conducted while cooling the grinder due to the heat generated during this operation. The silver particles produced by this process are in the form of flakes that preferably have a diameter in the range of from 0.1 to 10 micrometers.

To facilitate formation of the desired thin coating of the organosilicon compound on the silver particles or when the compound has a relatively high viscosity, the compound(s) used to treat the particles is preferably dissolved in a suitable organic liquid. No specific restrictions apply to organic solvents usable for this purpose. Suitable solvents include but are not limited to alcohols such as methanol, ethanol, and isopropanol; aliphatic compounds such as hexane, heptane, and octane; alicyclic compounds such as cyclohexane and cyclooctane; aromatic compounds such as toluene and xylene; ketones such as acetone, methyl ethyl ketone, and methyl isobutyl ketone; and esters such as ethyl acetate, and Carbitol™ acetate.

No specific restrictions apply to the conditions for treating the surface of the silver particles with an organosilicon compound during the preparation of ingredient C. Treatment of the particles is preferably carried out at temperatures from ambient to 100° C., preferably at least 50° C., for periods from 24 to 150 hours.

To facilitate drying and to also remove excess organosilicon compound adhering on the surface of the silver particles, the treated silver particles are preferably washed with any of the organic solvents listed in the preceding paragraph and then dried for at least 24 hours at temperatures from ambient to 105° C.

The concentration of the treated silver particles (ingredient C) in the present composition is typically from 50 to 2,000 parts by weight, preferably from 300 to 600 parts, per 100 parts by weight of the polyorganosiloxane referred to in this specification as ingredient A. When the concentration of ingredient C is less than 50 parts per 100 parts of ingredient A, there is a substantial decline in the electrical conductivity of the cured silicone rubber product.

When the concentration of ingredient C exceeds 2,000 weight parts per 100 weight parts of ingredient A, there is typically a substantial decline in the fluidity of the corresponding composition, and the ability to process the composition into a suitable cured elastomer becomes very problematic.

The Alkenyl-Substituted Polyorganosiloxane (Ingredient A)

The alkenyl-substituted polyorganosiloxane is referred to as ingredient A of the present curable compositions. This ingredient contains at least 2 alkenyl radicals in each molecule. Suitable alkenyl radicals include but are not limited to vinyl, allyl, butenyl, pentenyl, hexenyl, and heptenyl, with vinyl being preferred. The location of the alkenyl radicals in ingredient A can be at the molecular chain terminals, on non-terminal silicon atoms, or at both positions.

No specific restrictions apply to the silicon-bonded organic groups other than alkenyl radicals. These groups are substituted or unsubstituted monovalent hydrocarbon radicals that include but are not limited to alkyl such as methyl, ethyl, propyl, butyl, pentyl and hexyl; aryl such as phenyl, tolyl and xylyl; aralkyl such as benzyl and phenethyl; and haloalkyl such as 3-chloropropyl and 3,3,3-trifluoropropyl. Of these radicals, methyl and phenyl are preferred.

The molecular structure of ingredient A is also not critical and is exemplified by straight chains, partially branched straight chains, branched chains, and network type resin structures. Straight-chain and partially branched straight-chain structures are preferred.

The viscosity of ingredient A is not critical. Typical polymers exhibit viscosity values, measured at 25° C., in the range from 50 to 500,000 centipoise (0.05 to 500 Pa·s) while particularly preferred values fall in the range of from 400 to 100,000 centipoise (0.4 to 100 Pa·s).

Specific polyorganosiloxanes suitable for use as ingredient A include but are not limited to trimethylsiloxy-endblocked dimethylsiloxane/methylvinylsiloxane copolymers, trimethylsiloxy-endblocked polymethylvinylsiloxanes, trimethylsiloxy-endblocked methylvinylsiloxane/methylphenylsiloxane copolymers, trimethylsiloxy-endblocked dimethylsiloxane/methylvinylsiloxane/methylphenylsiloxane copolymers, dimethylvinylsiloxy-endblocked polydimethylsiloxanes, dimethylvinylsiloxy-endblocked polymethylvinylsiloxanes, dimethylvinylsiloxy-endblocked polymethylphenylsiloxanes, dimethylvinylsiloxy-endblocked dimethylsiloxane/methylvinylsiloxane copolymers, dimethylvinylsiloxy-endblocked dimethylsiloxane/methylphenylsiloxane copolymers, silanol-endblocked dimethylsiloxane/methylvinylsiloxane copolymers, silanol-endblocked polymethylvinylsiloxanes, and silanol-endblocked dimethylsiloxane/methylvinylsiloxane/methylphenylsiloxane copolymers.

Alkenyl-substituted organosiloxane resins suitable for use as ingredient A include but are not limited to resins composed of the combination $R_3SiO_{1/2}$ and $SiO_{4/2}$ units, the $RSiO_{3/2}$ unit alone, the combination of $R_2SiO$ and $RSiO_{3/2}$ units, the combination of $R_2SiO$, $RSiO_{3/2}$ and $SiO_{4/2}$ units, and mixtures containing two or more of these resins.

The monovalent hydrocarbon radicals represented by R in the preceding formulae can be substituted or unsubstituted and include but are not limited to alkyl such as methyl, ethyl, propyl, butyl, pentyl and octyl; alkenyl such as vinyl, allyl, butenyl, pentenyl and hexenyl; aryl such as phenyl, tolyl and xylyl; and haloalkyl such as 3-chloropropyl and 3,3,3-trifluoropropyl. The only proviso is that at least one of the R groups represents an alkenyl radical.

The Organohydrogensiloxane (Ingredients B and B')

The organohydrogensiloxanes referred to in this specification as ingredients B and B' function as crosslinkers that are responsible for curing the present compositions. The organohydrogensiloxane should contain at least 2 silicon-bonded hydrogen atoms in each molecule. The location of these silicon-bonded hydrogen atoms is not critical, and they may be located, for example, at the molecular chain terminals or on non-terminal silicon atoms, or at both positions.

No specific restrictions apply to the silicon-bonded organic groups in ingredient B, which are substituted and unsubstituted monovalent hydrocarbon radicals. Specific radicals are listed in the preceding section of this specification relating to ingredient A, with the exception that alkenyl and other ethylenically unsaturated radicals are excluded.

The molecular structure of ingredient B is not critical and is specifically exemplified by straight chain, partially branched straight chain, branched, and network. Straight-chain and partially branched straight-chain structures are preferred.

The viscosity of ingredient B is not critical, however preferred viscosity values measured at 25° C. are in the range of from 1 to 50,000 centipoise, (0.001 to 50 Pa·s), with particularly preferred values being in the range of 5 to 1,000 centipoise (0.005 to 1 Pa·s).

Examples of suitable organohydrogensiloxanes include but are not limited to trimethylsiloxy-endblocked polymethylhydrogensiloxanes, trimethylsiloxy-endblocked dimethylsiloxane/methylhydrogensiloxane copolymers, trimethylsiloxy-endblocked methylhydrogensiloxane/methylphenylsiloxane copolymers, trimethylsiloxy-endblocked dimethylsiloxane/methylhydrogensiloxane/methylphenylsiloxane copolymers, dimethylhydrogensiloxy-endblocked polydimethylsiloxanes, dimethylhydrogensiloxy-endblocked polymethylhydrogensiloxanes, dimethylhydrogensiloxy-endblocked dimethylsiloxane/methylhydrogensiloxane copolymers, dimethylhydrogensiloxy-endblocked dimethylsiloxane/methylphenylsiloxane copolymers, dimethylhydrogensiloxy-endblocked polymethylphenylsiloxanes, silanol-endblocked polymethylhydrogensiloxanes, silanol-endblocked dimethylsiloxane/methylhydrogensiloxane copolymers, silanol-endblocked methylhydrogensiloxane/methylphenylsiloxane copolymers, and silanol-endblocked dimethylsiloxane/methylhydrogensiloxane/methylphenylsiloxane copolymers.

In an alternative embodiment of ingredient B, referred to as ingredient B', the organohydrogensiloxane functions both as an adhesion promoter and as a crosslinker for the curable composition. Each molecule of ingredient B' must contain at least 2 silicon-bonded hydrogen atoms and at least 1 silicon-bonded alkoxy group. The location of the silicon-bonded hydrogen atoms in ingredient B' is not critical. These hydrogen atoms may be bonded, for example, to terminal or non-terminal silicon atoms, or at both of these positions. The bonding position for the silicon-bonded alkoxy groups in ingredient B' is also not critical, and this group may be bonded to terminal and/or non-terminal silicon atoms.

The silicon-bonded organic groups that can be present in ingredient B' are free of ethylenic unsaturation and are specifically exemplified by, but not limited to, the monovalent substituted and unsubstituted hydrocarbon radicals that can be present in ingredient B. Ingredient B' can contain other adhesion-promoting groups that will not interfere with curing of the present compositions. These additional adhesion-promoting groups include but are not limited to epoxy groups that are bonded to a silicon atom by means of a carbon atom that is not a part of the epoxide ring.

The molecular structure of ingredient B' includes but is not limited to straight chains, partially branched straight chains, branched chains, cyclic and network structures. Mixtures of polyorganosiloxanes having two or more types of structures can also be used. While the viscosity of ingredient B' is not critical, viscosities of from 1 to 50,000 centipoise (0.001 to 50 Pa·s), measured at 25° C., are preferred, the range from of 5 to 1,000 centipoise (0.005 to 1 Pa·s) is particularly preferred.

Polyorganosiloxanes suitable for use as ingredient B' include but are not limited to the following structures:

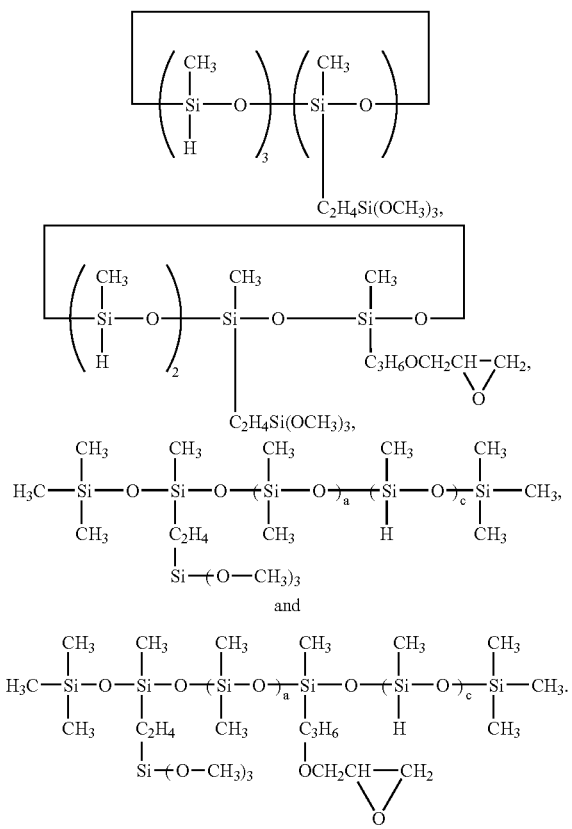

In the foregoing formulae, a represents an integer with a value of at least 1, and c represents an integer with a value of at least 2.

No particular restrictions apply to the method for preparing ingredient B'. Suitable methods are include but are not limited to:

(a) the platinum-catalyzed addition of an alkenyl-containing alkoxysilane to a portion of the silicon-bonded hydrogen atoms of an organohydrogensiloxane containing at least 3 silicon-bonded hydrogen atoms in each molecule, and (b) the platinum-catalyzed addition of an alkenyltrialkoxysilane and an alkenyl-containing epoxy compound to a portion of the silicon-bonded hydrogen atoms of an organohydrogensiloxane containing at least 4 silicon-bonded hydrogen atoms in each molecule.

Platinum catalysts useful for preparing ingredient B' include the same catalysts described herein as ingredient D.

Polyorganosiloxanes containing at least three or four silicon-bonded hydrogen atoms and suitable for use in preparing ingredient B' include but are not limited to trimethylsiloxy-endblocked polymethylhydrogensiloxanes, trimethylsiloxy-endblocked dimethylsiloxane-methylhydrogensiloxane copolymers, dimethylhydrogensiloxy-endblocked polymethylhydrogensiloxanes, dimethylhydrogensiloxy-endblocked dimethylsiloxane-methylhydrogensiloxane copolymers, cyclic methylhydrogensiloxanes, and cyclic dimethylsiloxane-methylhydrogensiloxane copolymers.

Alkenyl-containing alkoxysilanes suitable for use in preparing ingredient B' include vinyltrimethoxysilane, vinyltriethoxysilane, vinylmethyldimethoxysilane, vinyldimethylmethoxysilane, allyltrimethoxysilane, allyltriethoxysilane, allylmethyldimethoxysilane, allyldimethylmethoxysilane, and butenyltrimethoxysilane.

Alkenyl-containing epoxy compounds suitable for use in preparing ingredient B' include but are not limited to vinyl glycidyl ether, allyl glycidyl ether, butenyl glycidyl ether, 3,4-epoxycyclohexylethene, 3-(3,4-epoxycyclohexyl)propene, and 4-(3,4-epoxycyclohexyl)butene.

Because ingredient B' must contain at least two silicon bonded hydrogen atoms per molecule, the total number of moles of alkenyl-containing alkoxysilane and alkenyl-containing epoxy compound used to prepare this ingredient must be at least two less than the number of moles of silicon-bonded hydrogen present in the initial organohydrogensiloxane.

The concentration of ingredients B and B' in the present compositions is sufficient to provide from 0.5 to 3 silicon-bonded hydrogen atoms per alkenyl group in ingredient A. The composition will not cure adequately when ingredients B and B' provide fewer than 0.5 silicon-bonded hydrogen atoms per alkenyl radical in ingredient A. At the other extreme, the presence in the curable composition of more than 3 silicon-bonded hydrogen atoms per alkenyl group yields a cured electrically conductive silicone rubber with a drastically reduced heat resistance.

The Platinum-Containing Hydrosilylation Catalyst (Ingredient D)

The platinum containing hydrosilylation catalyst, ingredient D, accelerates the cure of the present compositions. Any metal from the platinum group of the periodic table capable of functioning as catalysts for hydrosilylation reactions can be used as ingredient D. Suitable catalysts include but are not limited to platinum black, platinum supported on powdered alumina, platinum supported on powdered silica, platinum supported on powdered carbon, chloroplatinic acid, alcohol solutions of chloroplatinic acid, chloroplatinic acid/olefin complexes, chloroplatinic acid/vinylsiloxane complexes, and platinum catalysts dispersed in microparticulate forms of thermoplastic organic resins such as methyl methacrylate resins, polycarbonate resins, polystyrene resins, and silicone resins.

The concentration of ingredient D in the present compositions is typically not critical so long as it is sufficient to promote curing of the composition, and is typically equivalent to from 1 to 100 ppm of platinum metal, based on the combined weights of ingredients A and B.

The Optional Alkoxy-Functional Organosilicon Compound (Ingredients E and E').

Curable compositions of the present invention typically contain only ingredients A–D. However, an organosilicon compound containing at least one silicon-bonded alkoxy group per molecule, optional ingredients E and E', is preferably included in the present compositions to diminish timewise variations in contact resistance and volume resistivity values exhibited by cured materials prepared from these compositions. Ingredient E is used when ingredient B is employed as the organohydrogensiloxane, and ingredient E' is used in combination with ingredient B'.

Examples of suitable organosilicon compounds for ingredient E are alkoxysilanes such as tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltrimethoxysilane, allyltrimethoxysilane, allyltriethoxysilane, 3-glycidoxypropyltrimethoxysilane, 3-methacryloxypropyltrimethoxysilane, and organosilicon compounds with the following formulae:

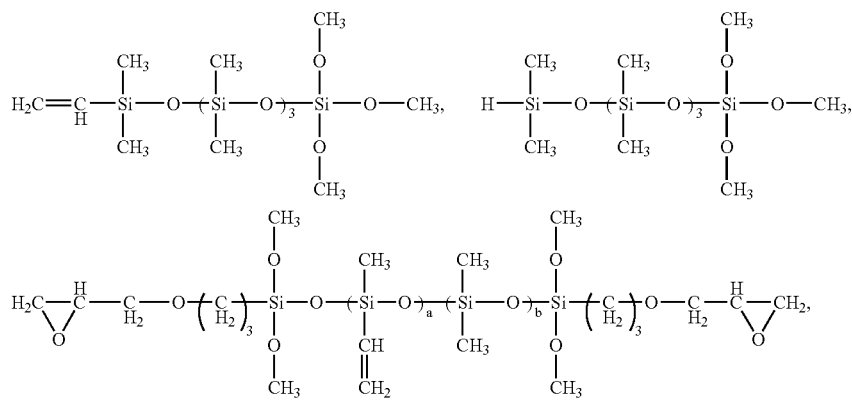

wherein a and h are each integers with values of at least 1

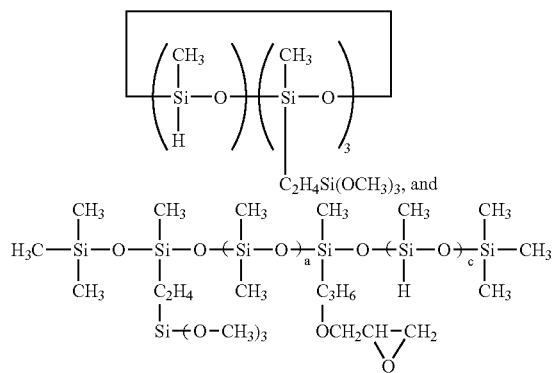

where a is an integer with a value of at least 1 and c is 0 or 1.

Ingredient E' can be present as an optional ingredient when ingredient B' is used as the organohydrogenpolysiloxane. Ingredient E' is an organosilicon compound that contains silicon-bonded alkoxy groups and either 1 or no silicon-bonded hydrogen. Ingredient E' can be any of the organosilicon compounds suitable for use as ingredient E that contain a maximum of one silicon-bonded hydrogen atom.

When they are present, the concentrations of ingredients E and E' are up to 20 weight percent, based on the weight of ingredient A, preferably from 0.5 to 8 weight percent. The appearance of timewise variations in the contact resistance and volume resistivity values of the cured elastomer becomes a possibility when ingredient E or E' is not present. On the other hand, the addition of more than 20 weight percent of ingredient E or E' based on ingredient A results in a decline in the storage stability of the resulting composition and also in an increase in the hardness of the cured elastomer with elapsed time.

Other Optional Ingredients

A cure inhibitor may also be added to the instant composition as an optional ingredient to improve the storage stability and handling characteristics of the curable composition. Suitable cure inhibitors include but are not limited to alkynyl alcohols such as 3-methyl-1-butyn-3-ol, 3,5-dimethyl-1-hexyn-3-ol and phenylbutynol; ene-yne compounds such as 3-methyl-3-penten-1-yne and 3,5-dimethyl-3-hexen-1-yne; and 1,3,5,7-tetramethyl-1,3,5,7-tetravinylcyclotetrasiloxane, 1,3,5,7-tetramethyl-1,3,5,7-tetrahexenylcyclotetra-siloxane, and benzotriazole.

These cure inhibitors are preferably added at 0.001 to 5 weight parts per 100 weight parts of ingredient A.

The present curable compositions can also include an inorganic filler to impart a suitable hardness and strength to the cured elastomer. Suitable inorganic fillers include but are not limited to fumed silica, crystalline silica, calcined silica, wet-process silica, fumed titanium oxide, and carbon black, and inorganic filler whose surface has been treated with an organosilicon compound such as an organoalkoxysilane, organochlorosilane or an organodisilazane.

These inorganic fillers are preferably added at no more than 50 weight parts per 100 weight parts of ingredient A.

The elastomers prepared using the present curable organosiloxane compositions typically exhibit volume resistivities below 0.1 ohm-cm, preferably below $1 \times 10^{-3}$ ohm-cm, and are useful as electrically conductive adhesives, electrically conductive die-bonding agents, as heat-dissipating die-bonding agents, and as electromagnetic-shielding agents.

The following examples describe preferred compositions of the present invention and the electrically conducting elastomers prepared using these compositions and should not be interpreted as limiting the scope of the present invention as defined in the accompanying claims. Unless otherwise specified all parts and percentages are by weight, and reported viscosity values were measured at 25° C.

The following methods were used to measure the properties of the curable organosiloxane compositions and the electrically conductive cured elastomers prepared therefrom.

Appearance of the Electrically Conductive Silicone Rubber Compositions.

The electrically conductive silicone rubber compositions were stored in transparent glass bottles that were maintained under refrigeration. The appearance of the composition was inspected immediately after preparation (initial evaluation) and following 1 month, 3 months, and 6 months of storage.

Curability of the Compositions

The curable, electrically conductive compositions were stored under refrigeration after being prepared. Samples were taken from these compositions immediately following their preparation (initial evaluation) and after 1, 3, and 6 months, and cured elastomers were then prepared from these samples by heating them for 30 minutes at 150° C. The curability of the compositions was evaluated by measuring the hardness of the cured elastomers using a JIS A hardness meter in accordance with JIS K 6301.

Contact Resistance of the Silicone Rubbers

Each of the curable compositions was coated on one surface of a circuit board and heated for 30 minutes at 150° C. to produce a cured elastomer. The contact resistance of the silicone rubber was then measured using the "4-point method" to give the initial value. The contact resistance of the silicone rubber was measured by the same method after the elastomer-coated circuit board had been heated for 100 hours, 500 hours, and 1,000 hours in an oven maintained at 150° C.

Volume Resistivity of the Silicone Rubbers

An electrically conductive elastomer in the form of a sheet with a thickness of at least 1 mm was prepared by heating the curable silver-filled organosiloxane compositions at 150° C. for 30 minutes. The initial volume resistivity of this silicone rubber sheet was measured using a model K-705RL meter from Yugen Kaisha Kyowa Riken. In order to measure the timewise variation in the volume resistivity of the silicone rubber, the volume resistivity of each of the elastomer sheets was measured by the same method after the sheets had been held for 100 hours, 500 hours, and 1,000 hours in a 150° C. oven.

Adhesion of the Cured Elastomers

The adhesion of the electrically conductive silicone elastomers was measured using a tab bonding test. In accordance with this test method, the curable compositions to be evaluated were first heated for 30 minutes at 150° C. on an aluminum plate to form a silicone rubber bead measuring 20 mm in width, 20 mm in length and 5 mm in thickness. This cured elastomeric bead was then peeled from the aluminum plate, and the surface that had been in contact with the heated plate was examined. A rating of "CF" indicates the occurrence of cohesive failure within the body of the elastomer, thereby leaving the plate covered with cured elastomer. A rating of "AF" refers to adhesive failure that occurred only at the interface between the elastomer and the aluminum plate surface. A rating of "partial AF" indicates only partial interfacial failure and some within the body of the cured elastomer. A score of "TCF" refers to the presence of a thin layer of silicone rubber adhering to the aluminum plate.

The evaluation results for curable compositions and elastomers of the present invention are recorded in Table 1 and the evaluation results for the comparative examples are recorded in Table 2.

EXAMPLE 1

20 g of silver nitrate were dissolved in 40 mL water, from which granular silver oxide was subsequently precipitated by the addition of a 46% aqueous solution of sodium hydroxide. This granular silver oxide was chemically reduced with formalin, and the product was repeatedly washed and filtered to yield a granular form of reduced silver with an average particle diameter of 1 micrometer. The silver particles were then immersed in a Carbitol acetate solution of a dimethylsiloxane/phenylsiloxane resin exhibiting a softening point of 90° C. and the average unit formula

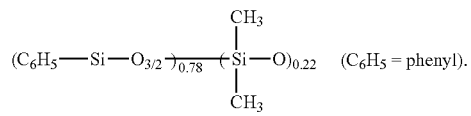

Following surface treatment using methylphenylsiloxane resin, the silver particles were recovered on filter paper and then dried at room temperature to yield granular silver particles with an average particle diameter of 1 micrometer.

A curable organosiloxane composition of this invention was prepared by blending the following ingredients to homogeneity:

600 parts by weight of the treated silver particles described in the immediatel preceding paragraph, 100 parts by weight of a dimethylvinylsiloxy-endblocked dimethylpolysiloxane with a viscosity of 2 Pa·s (2,000 centipoise) and a vinyl content of 0.2 weight percent, 1 part by weight of a trimethylsiloxy-endblocked methylhydrogen-polysiloxane exhibiting a viscosity of 0.03 Pa·s (30 centipoise) and containing 1.5 weight percent of silicon-bonded hydrogen, 7 parts by weight of 3-glycidoxypropyltrimethoxysilane, a quantity of a chloroplatinic acid/vinylsiloxane complex, equivalent to 5 ppm of complexed platinum metal in the composition, and 300 ppm, based on the weight of the curable composition, of phenylbutynol as a catalyst inhibitor.

The appearance and curability of the resultant curable composition were evaluated together with the adhesion, contact resistance and volume resistivity of the elastomer prepared by curing the composition. The results of these evaluations are reported in Table 1.

COMPARATIVE EXAMPLE 1

20 g silver nitrate were dissolved in 40 mL water, from which granular silver oxide was subsequently precipitated by the addition of 46% aqueous sodium hydroxide. This granular silver oxide was reduced with formalin, and the product was repeatedly washed and filtered to yield granular reduced silver particles with an average particle diameter of 1 micrometer.

A curable organosiloxane composition outside the scope of the claimed invention was prepared by mixing the types and amounts of ingredients described in Example 1 of this specification to homogeneity using the silver particles prepared as described in the immediately preceding paragraph.

The appearance and curability of the resultant curable organosiloxane composition together with the adhesion, contact resistance and volume resistivity of the cured elastomer prepared from this composition were evaluated and the results are reported in Table 2.

EXAMPLE 2

20 g silver nitrate were dissolved in 40 mL water, from which granular silver oxide was subsequently precipitated by the addition of 46% aqueous sodium hydroxide; This granular silver oxide was reduced with formalin, and the product was repeatedly washed and filtered to yield granular reduced silver particles with an average particle diameter of 1 micrometer. The particles were ground in a ball mill using as the lubricant a Carbitol acetate solution of dimethylsiloxane/phenylsiloxane resin described in Example 1.

After surface treatment of the silver particles, the particles were washed with xylene to obtain particles in the form of flakes with an average particle diameter of 8 micrometers.

An electrically conductive silicone rubber composition was subsequently prepared by mixing the types and amounts of ingredients described in Example 1 of this specification to homogeneity using the silver particles prepared as described in the immediately preceding paragraph.

The appearance and curability of the resultant curable composition together with the adhesion, contact resistance and volume resistivity of the elastomer obtained by curing the composition were evaluated and the results are reported in Table 1.

COMPARATIVE EXAMPLE 2

20 g silver nitrate were dissolved in 40 mL water, from which granular silver oxide was subsequently precipitated by the addition of 46% aqueous sodium hydroxide. This granular silver oxide was reduced with formalin, and the product was repeatedly washed and filtered to yield granular reduced silver particles with an average particle diameter of 1 micrometer. The reduced silver particles were ground in a ball mill using as a lubricant a Carbitol acetate solution of stearic acid. Following surface treatment with stearic acid, the silver particles were washed with methanol to yield silver flake with an average particle diameter of 8 micrometers.

A curable organosiloxane composition outside the scope of the present invention was prepared by mixing the types and amounts of ingredients described in Example 1 of this specification to homogeneity using the silver particles prepared as described in the immediately preceding paragraph.

The appearance and curability of the resultant curable composition together with the adhesion, contact resistance and volume resistivity of the elastomer prepared by curing the composition were evaluated and the results are reported in Table 2.

EXAMPLE 3

Granular silver particles prepared by atomization in water were ground in a ball mill using as a lubricant the xylene solution of a dimethylvinylsiloxy-endblocked polydimethylsiloxane exhibiting a viscosity 100 centipoise (0.1 Pa·s). Following this treatment, the silver particles were washed with xylene to yield silver flakes with an average particle diameter of 10 micrometers.

A curable organosiloxane composition of the present invention was prepared by blending the following ingredients to homogeneity:

960 weight parts of the silver flake prepared as above,
100 parts by weight of a dimethylvinylsiloxy-endblocked dimethylpolysiloxane with a viscosity of 2,000 centipoise (2 Pa·s) and a vinyl content of 0.2 weight percent, 1 part by weight of a trimethylsiloxy-endblocked polymethylhydrogensiloxane with a viscosity of 0.03 Pa·s (30 centipoise) and a silicon-bonded hydrogen content of 1.5 weight percent, 7 parts by weight of 3-glycidoxypropyltrimethoxysilane, a quantity of a chloroplatinic acid/vinylsiloxane complex sufficient to provide 5 ppm, based on the total weight of the curable composition, of complexed platinum metal in the composition, and
300 ppm, based on the weight of the curable composition, of phenylbutynol as the catalyst inhibitor.

The appearance and curability of the resultant curable composition together with the adhesion, contact resistance and volume resistivity of the elastomer prepared by curing the composition were evaluated and the results are reported in Table 1.

EXAMPLE 4

20 g silver nitrate were dissolved in 40 mL water, from which granular silver oxide was subsequently precipitated by the addition of 46% aqueous sodium hydroxide. This granular silver oxide was reduced with formalin, and the product was repeatedly washed and filtered to yield granular reduced silver particles with an average diameter of 3 micrometers. These particles were ground in a ball mill using as lubricant the Carbitol acetate solution of a dimethylvinylsiloxy-endblocked dimethylpolysiloxane (viscosity=0.1 Pa·s; 100 centipoise). After surface treatment with dimethylpolysiloxane, the silver particles were washed with Carbitol acetate to yield a silver flake with an average particle diameter of 4 micrometers.

A curable organosiloxane composition of the present invention was prepared by blending the following ingredients to homogeneity:
400 parts by weight of the silver flake prepared as described in the immediately preceding paragraph,
100 parts by weight of mixture containing a) a dimethylvinylsiloxy-endblocked polydimethylsiloxane and b) an organosiloxane resin containing trimethylsiloxy, dimethylvinylsiloxy and $SiO_{4/2}$ units, the mixture exhibiting a viscosity of 8,000 centipoise (8 Pa·s) and a vinyl content of 0.8 weight percent;
5 parts by weight of a trimethylsiloxy-endblocked polymethyl-hydrogensiloxane with a viscosity of 30 centipoise (0.03 Pa·s) and a silicon-bonded hydrogen content of 1.5 weight percent,
10 parts by weight of an organosilicon compound with the formula

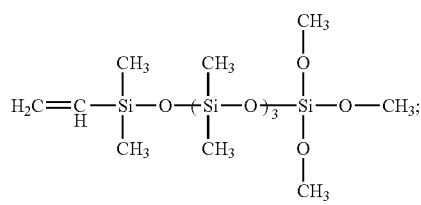

a quantity of a chloroplatinic acid/vinylsiloxane complex equivalent to 5 ppm of complexed platinum metal, based on the total weight of the curable composition, and 300 ppm, based on the total weight of the curable composition, of phenylbutynol as the catalyst inhibitor.

The appearance and curability of the resultant curable composition together with the adhesion, contact resistance and volume resistivity of the elastomer prepared by curing the composition were evaluated and the results are reported in Table 1.

COMPARATIVE EXAMPLE 3

20 g of silver nitrate were dissolved in 40 mL water, from which granular silver oxide was subsequently precipitated by the addition of 46% aqueous sodium hydroxide. This granular silver oxide was reduced with formalin, and the product was repeatedly washed and filtered to yield granular reduced silver particles with an average particle diameter of 3 micrometers. These reduced silver particles were ground in a ball mill using stearic acid as the lubricant. After surface treatment with stearic acid, the silver particles were washed with xylene to yield particles in the form of flakes with an average particle diameter of 4 micrometers.

A curable organosiloxane composition outside the scope of the present invention was prepared by blending the following ingredients to homogeneity:
450 parts by weight of the silver flakes described in the immediately preceding paragraph, 100 parts by weight of a mixture containing a) a dimethylvinylsiloxy-endblocked polydimethylsiloxane and b) an organosiloxane resin containing trimethylsiloxy, dimethylvinylsiloxy and $SiO_{4/2}$ units, the mixture exhibiting a viscosity of 8,000 centipoise (8 Pa·s) and a vinyl content of 0.8 weight percent;
5 parts by weight of a trimethylsiloxy-endblocked polymethylhydrogensiloxane with a silicon-bonded hydrogen content of 1.5 weight percent and a viscosity of 0.03 Pa·s (30 centipoise), 10 parts by weight of an organosilicon compound with the formula

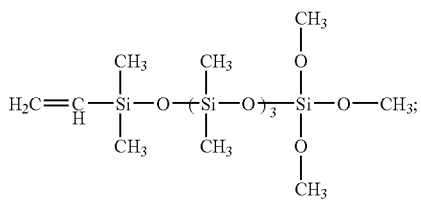

a quantity of a chloroplatinic acid/vinylsiloxane complex equivalent to 5 ppm, based on the total weight of the curable composition, of complexed platinum metal in the composition, and 300 ppm, based on the total weight of the curable composition, of phenylbutynol as the catalyst inhibitor.

The appearance and curability of the resultant curable composition together with the adhesion, contact resistance and volume resistivity of the elastomer prepared by curing the composition were evaluated and the results are reported in Table 2.

EXAMPLE 5

20 g silver nitrate were dissolved in 40 mL water, from which granular silver oxide was subsequently precipitated by the addition of 46% aqueous sodium hydroxide. This granular silver oxide was reduced with formalin, and the product was repeatedly washed and filtered to yield granular reduced silver particles with an average particle diameter of 1 micrometer. These particles were ground in a ball mill using a methanol solution of vinyltrimethoxysilane as the lubricant. Following this treatment the silver particles were washed with methanol to yield silver flake with an average particle diameter of 2 micrometers.

An electrically conductive silicone rubber composition according to the invention was subsequently prepared by mixing the following to homogeneity:
400 parts by weight of the silver particles described in the immediately preceding paragraph, 100 parts by weight of a dimethylvinylsiloxy-endblocked polydimethylsiloxane with a viscosity of 2,000 centipoise (2 Pa·s) and a vinyl content of 0.2 weight percent,
1 weight part trimethylsiloxy-endblocked polymethylhydrogensiloxane with a viscosity of 30 centipoise (0.03 Pa·s) and a silicon-bonded hydrogen content of 1.5 weight percent, 7 parts by weight of 3-glycidoxypropyltrimethoxysilane,
a quantity of a chloroplatinic acid/vinylsiloxane complex equivalent to 5 ppm, based on the total weight of the curable composition, of complexed platinum metal in the composition, and
300 ppm, based on the total weight of the curable composition, of phenylbutynol as the catalyst inhibitor.

The appearance and curability of the resultant curable composition together with the adhesion, contact resistance and volume resistivity of the elastomer prepared by curing the composition were evaluated and the results are reported in Table 1.

EXAMPLE 6

Dendritic electrolytic silver particles with an average particle diameter of 10 micrometers were ground in a ball mill using as the lubricant a Carbitol acetate solution of a dimethylsiloxane/phenylsiloxane resin exhibiting a softening point of 90° C. and the following average unit formula.

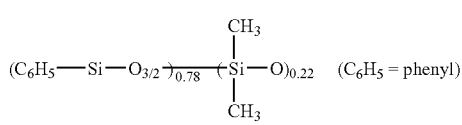

Following this surface treatment, the silver particles were washed with xylene to yield silver flake with an average particle diameter of 12 micrometers.

A curable composition of the present invention was prepared by blending the following ingredients to homogeneity:
400 parts by weight of the silver particles described in the immediately preceding paragraph,
100 parts of a dimethylvinylsiloxy-endblocked polydimethylsiloxane with a viscosity of 2,000 centipoise (2 Pa·s) and a vinyl content of 0.2 weight percent,
1 part by weight of a trimethylsiloxy-endblocked polymethylhydrogensiloxane with a viscosity of 30 centipoise (0.03 Pa·s) and a silicon-bonded hydrogen content of 1.5 weight percent,
7 parts by weight of 3-glycidoxypropyltrimethoxysilane, a quantity of a chloroplatinic acid/vinylsiloxane complex equivalent to 5 ppm, based on the total weight of the curable composition, of complexed platinum metal, and
300 ppm, based on the total weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 1.

EXAMPLE 7

100 g reduced silver particles in flake form with an average particle diameter 4 micrometers were placed in a flask, followed by the addition of 170 g heptane, 0.5 g tetrabutyl titanate, and 5 g trimethylethoxysilane. After stirring at room temperature for 4 hours, the silver particles were isolated by filtration. The treated particles were washed with methanol and then dried at 35° C. for 48 hours to yield silver flake with an average particle diameter of 4 micrometers.

A curable organosiloxane composition of this invention was prepared by blending the following ingredients to homogeneity:
400 parts by weight of the silver particles described in the immediately preceding paragraph, 100 weight parts dimethylvinylsiloxy-endblocked polydimethylsiloxane with a viscosity of 2,000 centipoise (2 Pa·s) and a vinyl content of 0.2 weight percent,
1 part by weight of a trimethylsiloxy-endblocked polymethylhydrogensiloxane with a viscosity of 0.03 Pa·s (30 centipoise) and a silicon-bonded hydrogen content of 1.5 weight percent,
7 parts by weight of 3-glycidoxypropyltrimethoxysilane, a quantity of a chloroplatinic acid/olefin complex equivalent to 5 ppm, based on the total weight of the curable composition, of complexed platinum metal, and
300 ppm, based on the total weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 1.

EXAMPLE 8

Silver particles with an average particle diameter not exceeding 1 micrometer, prepared by the reduction of silver nitrate, were ground in a ball mill using as lubricant a Carbitol acetate solution of a dimethylvinylsiloxy-endblocked polydimethylsiloxane exhibiting a viscosity of 100 centipoise (0.1 Pa·s) and containing 0.2 weight percent vinyl. Following the grinding operation, the excess dimethylpolysiloxane adhering on the surface of the silver particles was removed by washing the particles with xylene. This yielded particles in the form of flakes with an average particle diameter of 4 micrometers.

A curable organosiloxane composition of the present invention was prepared by blending the following ingredients to homogeneity:
400 parts by weight of the silver particles described in the immediately preceding paragraph,
100 parts by weight of dimethylvinylsiloxy-endblocked polydimethylsiloxane with a viscosity of 2,000 centipoise (2 Pa·s) and a vinyl content of 0.2 weight percent,
1 part by weight of a trimethylsiloxy-endblocked polymethylhydrogensiloxane with a viscosity of 30 centipoise (0.03 Pa·s) and a silicon-bonded hydrogen content of 1.5 weight percent,
a quantity of chloroplatinic acid/vinylsiloxane complex equivalent to 5 ppm, based on the weight of the curable composition, of complexed platinum metal, and
300 ppm, based on the total weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 1.

COMPARATIVE EXAMPLE 4

Silver particles with an average particle diameter not exceeding 3 micrometers, prepared by the reduction of silver nitrate, were ground in a ball mill using stearic acid as lubricant. Following the grinding operation the excess stearic acid adhering on the surface of the silver particles was removed by washing with xylene, which yielded particles in the form of flakes with an average particle diameter of 4 micrometers.

A curable organosiloxane composition outside the scope of the present invention was prepared by combining the following ingredients to homogeneity:
400 parts by weight of the silver flake described in the immediately preceding paragraph,
100 parts by weight of a dimethylvinylsiloxy-endblocked polydimethylsiloxane with a viscosity of 2,000 centipoise (2 Pa·s) and a vinyl content of 0.2 weight percent,
1 part by weight of a trimethylsiloxy-endblocked polymethyl-hydrogen siloxane with a viscosity of 30 centipoise (0.03 Pa·s) and a silicon-bonded hydrogen content of 1.5 weight percent;
a quantity of a chloroplatinic acid/olefin complex equivalent to 5 ppm, based on the total weight of the curable composition, of complexed platinum metal, and
300 ppm, based on the weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 2.

EXAMPLE 9

Silver particles with diameters not exceeding 1 micrometer and prepared by the reduction of silver nitrate, were ground in a ball mill using vinyltrimethoxysilane as lubricant. Following the grinding operation the excess vinyltrimethoxysilane adhering on the surface of the silver particles was removed by washing with xylene, which yielded silver flake with an average particle diameter of 2 micrometers.

A curable organosiloxane composition of the present invention was prepared by blending the following ingredients to homogeneity:
480 parts by weight of the silver flake particles described in the immediately preceding paragraph,
100 parts by weight of a dimethylvinylsiloxy-endblocked polydimethylsiloxane with a viscosity of 2,000 centipoise (2 Pa·s) and a vinyl content of 0.2 weight percent;
3 parts by weight of a trimethylsiloxy-endblocked polymethylhydrogensiloxane with a viscosity of 30 centipoise (0.03 Pa·s) and a silicon-bonded hydrogen content of 1.5 weight percent;
14 parts by weight of an organosilicon compound with the formula

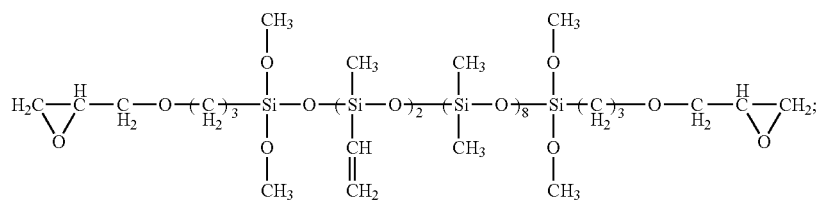

a quantity of a chloroplatinic acid/vinylsiloxane complex equivalent to 10 ppm, based on the weight of the curable composition, of complexed platinum metal, and 400 ppm, based on the weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 1.

COMPARATIVE EXAMPLE 5

Silver particles with an average particle diameter not exceeding 3 micrometer were prepared by the reduction of silver nitrate using hydrazine. These particles were ground in a ball mill using stearic acid as lubricant. Following grinding, the excess stearic acid adhering on the surface of the silver particles was removed by washing the particles with xylene. This produced particles in the form of flakes with an average diameter of 4 micrometers.

An electrically conductive silicone rubber composition was subsequently prepared by blending the following ingredients to homogeneity:

480 parts by weight of the silver flakes described in the immediately preceding paragraph,
100 parts by weight of a dimethylvinylsiloxy-endblocked polydimethylsiloxane with a viscosity of 2,000 centipoise (2 Pa·s) and containing 0.2 weight percent vinyl,
3 parts by weight of a trimethylsiloxy-endblocked polymethylhydrogensiloxane with a viscosity of 30 centipoise (0.03 Pa·s) and containing 1.5 weight percent of silicon-bonded hydrogen,
14 parts by weight of an organosilicon compound with the formula a quantity of a chloroplatinic acid/vinylsiloxane complex sufficient to provide 10 ppm, based on the weight of the curable composition, of complexed platinum metal; and 400 ppm, based on the weight of the curable composition, of phenylbutynol as a catalyst inhibitor.

The appearance and curability of the resultant curable composition together with the adhesion, contact resistance and volume resistivity of the elastomer prepared by curing the composition were evaluated and the results are reported in Table 2.

EXAMPLE 10

A mixture containing 1) 25 weight percent of reduced silver particles with an average particle diameter not exceeding 2 micrometers and prepared by the reduction of silver nitrate using hydrazine and 2) 75 weight percent atomized silver particles with an average particle diameter not exceeding 2 micrometers were ground in a ball mill using as lubricant a Carbitol acetate solution of a phenyl-containing silicone resin of Example 1. Following the grinding operation, the excess silicone resin adhering on the surface of the silver particles was removed by washing with xylene, yielding particles in the form of flakes with an average diameter of 3 micrometers.

A curable organosiloxane composition of the present invention was prepared by blending the following ingredients to homogeneity:

450 weight parts of the silver particles described in the immediately preceding paragraph,
100 weight parts of a mixture of dimethylvinylsiloxy-endblocked dimethylpolysiloxane and an organosiloxane resin containing the repeating units $(CH_3)_3SiO_{1/2}$ and $SiO_{4/2}$, the mixture exhibiting a viscosity of 8,000 centipoise (8 Pa·s) and a vinyl content of 0.8 weight percent;
10 parts by weight of hydrophobicized fume silica,
7 weight parts of an organosilicon compound with the formula

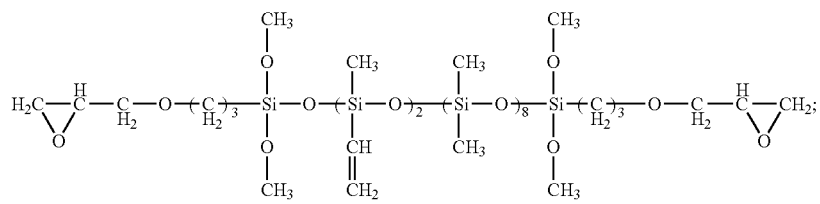

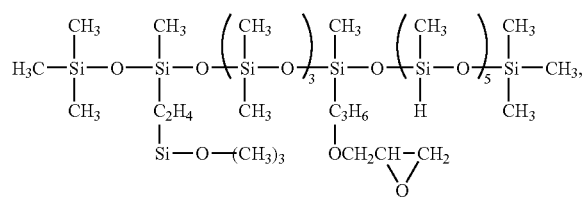

and a quantity of a microencapsulated chloroplatinic acid/vinylsiloxane complex equivalent to 10 ppm of platinum, based on the weight of the curable composition.

The catalyst was a dispersion of the chloroplatinic acid complex in a thermoplastic organosiloxane resin with a softening point of 80° C. to 90° C., The appearance and curability of the resultant curable composition together with the adhesion, contact resistance and volume resistivity of the elastomer prepared by curing the composition were evaluated and the results are reported in Table 1.

TABLE 1

| | Invention Examples | | | | | | | | | |
|---|---|---|---|---|---|---|---|---|---|---|
| | Example 1 | Example 2 | Example 3 | Example 4 | Example 5 | Example 6 | Example 7 | Example 8 | Example 9 | Example 10 |
| Untreated silver | reduced silver | reduced silver | atomized silver | reduced silver | reduced silver | electrolytic silver | reduced silver | reduced silver | reduced silver | reduced + atomized silver |
| Surface-treatment | MPSR | MPSR | DMPS | DMPS | VTMS | MPSR | TMES | DMPS | VTMS | MPSR |
| Silver powder after surface treatment | | | | | | | | | | |
| Average particle diameter (μm) | 1 | 8 | 10 | 4 | 2 | 12 | 4 | 4 | 2 | 3 |
| Shape | granular | flake | flake | flake | flake | flake | flake | flake | flake | flake |
| Appearance of the silicone rubber compositions | | | | | | | | | | |
| initial | uniform | uniform | uniform | uniform | uniform | uniform | uniform | uniform | uniform | uniform |
| after 1 mo | uniform | uniform | uniform | uniform | uniform | uniform | uniform | uniform | uniform | uniform |
| after 3 mos | uniform | uniform | uniform | uniform | uniform | uniform | uniform | uniform | uniform | uniform |
| after 6 mos | uniform | uniform | uniform | uniform | uniform | uniform | uniform | uniform | uniform | uniform |
| Hardness of the silicone rubbers (JIS A) | | | | | | | | | | |
| initial | 60 | 55 | 80 | 55 | 65 | 65 | 57 | 55 | 65 | 60 |
| after 1 mo | 60 | 55 | 80 | 55 | 65 | 65 | 57 | 55 | 65 | 60 |
| after 3 mos | 58 | 55 | 80 | 55 | 65 | 64 | 57 | 55 | 65 | 60 |
| after 6 mos | 58 | 54 | 80 | 54 | 64 | 63 | 56 | 54 | 65 | 60 |
| Contact resistance of the silicone rubbers (ohms) | | | | | | | | | | |
| initial | 0.8 | 0.4 | 1.0 | 0.2 | 0.2 | 0.5 | 0.5 | 0.8 | 0.2 | 0.8 |
| after 100 hrs | 0.9 | 0.4 | 1.0 | 0.3 | 0.5 | 0.6 | 0.5 | NM | 0.2 | 0.8 |
| after 500 hrs | 0.9 | 0.5 | 1.0 | 0.5 | 0.6 | 0.6 | 0.5 | NM | 0.3 | 0.8 |
| after 1000 hrs | 1.0 | 0.7 | 1.0 | 0.5 | 0.9 | 0.7 | 0.5 | NM | 0.3 | 0.9 |
| Volume resistivity of the silicone rubbers (ohm-cm) | | | | | | | | | | |
| initial | $6 \times 10^{-1}$ | $4 \times 10^{-4}$ | $4 \times 10^{2}$ | $4 \times 10^{-4}$ | $2 \times 10^{-4}$ | $1 \times 10^{-3}$ | $6 \times 10^{-4}$ | $4 \times 10^{-4}$ | $2 \times 10^{-4}$ | $2 \times 10^{-4}$ |
| 100 hrs | $6 \times 10^{-1}$ | $4 \times 10^{-4}$ | $4 \times 10^{2}$ | $4 \times 10^{-4}$ | $2 \times 10^{-4}$ | $1 \times 10^{-3}$ | $6 \times 10^{-4}$ | $4 \times 10^{-4}$ | $2 \times 10^{-4}$ | $2 \times 10^{-4}$ |
| after 500 hrs | $6 \times 10^{-1}$ | $4 \times 10^{-4}$ | $5 \times 10^{2}$ | $5 \times 10^{-4}$ | $4 \times 10^{-4}$ | $1 \times 10^{-3}$ | $7 \times 10^{-4}$ | $4 \times 10^{-4}$ | $4 \times 10^{-4}$ | $3 \times 10^{-4}$ |
| after 1000 hrs | $7 \times 10^{-1}$ | $4 \times 10^{-4}$ | $5 \times 10^{2}$ | $5 \times 10^{-4}$ | $5 \times 10^{-4}$ | $1 \times 10^{-3}$ | $8 \times 10^{-4}$ | $5 \times 10^{-4}$ | $5 \times 10^{-4}$ | $3 \times 10^{-4}$ |
| Adhesion | part AF | part AF | TCF | CF | part AF | part AF | part AF | AF | CF | CF |

MPSR = methylphenylsiloxane resin
VTMS = vinyltrimethoxysilane
NM = could not be measured
DMPS = dimethylpolysiloxane
TMES = trimethylethoxysilane
part AF = Partial adhesive failure

TABLE 2

| | Comparative Examples | | | | |
|---|---|---|---|---|---|
| | Comp. Ex. 1 | Comp. Ex. 2 | Comp. Ex. 3 | Comp. Ex. 4 | Comp. Ex. 5 |
| Untreated silver particles | | | | | |
| | reduced silver | reduced silver | reduced silver | reduced silver | reduced silver |
| Surface treating agent | | | | | |
| | none | stearic acid | stearic acid | stearic acid | stearic acid |
| Silver particles after surface treatment | | | | | |
| avg particle diameter (micrometers) | 1 | 8 | 4 | 4 | 4 |
| shape | granular | flake | flake | flake | flake |
| Appearance of the silicone rubber compositions | | | | | |
| initial | uniform | uniform | uniform | uniform | uniform |
| after 1 month | PS | PS | PS | PS | PS |
| after 3 months | PS | PS | PS | PS | PS |
| after 6 months | PS | PS | PS | PS | P5 |
| Hardness of the silicone rubber (JIS A) | | | | | |
| initial | 55 | 55 | 52 | 52 | 65 |
| after 1 month | 50 | 40 | 40 | 40 | 60 |
| after 3 months | 20 | not cured | not cured | not cured | 40 |
| after 6 months | not cured | not cured | not cured | not cured | not cured |
| Contact resistance of the silicone rubbers (ohms) | | | | | |
| initial | 2.0 | 0.6 | 0.4 | 0.4 | 0.4 |
| after 100 hours | 5.0 | 1.0 | 2.0 | NM | 1.0 |
| after 500 hours | 10.0 | 12.0 | 12.0 | NM | 11.2 |
| after 1000 hours | 15.0 | 20.0 | 18.0 | NM | 22.0 |
| Volume resistivity of the silicone rubbers (ohm-cm) | | | | | |
| initial | $4 \times 10^{-2}$ | $6 \times 10^{-4}$ | $8 \times 10^{-3}$ | $8 \times 10^{-3}$ | $8 \times 10^{-4}$ |
| after 100 hours | $4 \times 10^{-2}$ | $10 \times 10^{-4}$ | $15 \times 10^{-3}$ | $20 \times 10^{-3}$ | $9 \times 10^{-4}$ |
| after 500 hours | $10 \times 10^{-2}$ | $15 \times 10^{-4}$ | $50 \times 10^{-2}$ | 0.5 | $10 \times 10^{-4}$ |
| after 1000 hours | $20 \times 10^{-2}$ | $20 \times 10^{-4}$ | $80 \times 10^{-1}$ | 5.0 | $12 \times 10^{-4}$ |
| adhesion of the silicone rubber | partial AF | partial AF | partial AF | AF | CF |

NM = could not be measured
PS = phase separation

The invention claimed is:

1. A composition comprising the product obtained by blending to homogeneity:
   (A) 100 parts by weight of a polyorganosiloxane containing at least two alkenyl radicals per molecule;
   (B) an organohydrogensiloxane containing at least two silicon-bonded hydrogen atoms in each molecule, in a quantity sufficient to provide from 0.5 to 3 silicon-bonded hydrogen atoms per alkenyl radical in ingredient (A);
   (C) from 50 to 2,000 parts by weight of finely divided silver particles pre-treated with (ii) a silanol endblocked siloxane oligomer;
   (D) an amount sufficient to promote curing of said composition of a platinum catalyst;
   (E) up to 20 weight percent, based on the weight of component (A), of ingredient (E), an organosilicon compound containing at least one silicon-bonded alkoxy group per molecule; and
   (F) 0.001 to 5 weight parts, per 100 weight parts of ingredient (A), of a cure inhibitor.

2. The composition of claim 1, where ingredient (C)(ii) comprises a siloxane oligomer selected from the group consisting of:
   (a) a silanol endblocked dimethylsiloxane oligomer,
   (b) a silanol endblocked dimethylsiloxane/methylvinylsiloxane co-oligomer,
   (c) a silanol endblocked methylvinylsiloxane oligomer,
   (d) a silanol endblocked methylphenylsiloxane oligomer, and
   (e) a mixture thereof.

3. The composition of claim 1, where component (A) comprises:
   a polyorganosiloxane polymer selected from trimethylsiloxy-endblocked dimethylsiloxane/methylvinylsiloxane copolymer, trimethylsiloxy-endblocked polymethylvinylsiloxane, trimethylsiloxy-endblocked methylvinylsiloxane/methylphenylsiloxane copolymer, trimethylsiloxy-endblocked dimethylsiloxane/methylvinylsiloxane/methylphenylsiloxane copolymer, dimethylvinylsiloxy-endblocked polydimethylsiloxane, dimethylvinylsiloxy-endblocked polymethylvinylsiloxane, dimethylvinylsiloxy-endblocked polymethylphenylsiloxane, dimethylvinylsiloxy-endblocked dimethylsiloxane/methylvinylsiloxane copolymer, dimethylvinylsiloxy-endblocked dimethylsiloxane/methylphenylsiloxane copolymer, silanol-endblocked dimethylsiloxane/methylvinylsiloxane copolymer, silanol-endblocked polymethylvinylsiloxane, and silanol-endblocked dimethylsiloxane/methylvinylsiloxane/methylphenylsiloxane copolymer;
   an alkenyl-substituted organosiloxane resin selected from resins composed of the combination $R_3SiO_{1/2}$ and $SiO_{4/2}$ units, the $RSiO_{3/2}$ unit alone, the combination of $R_2SiO$ and $RSiO_{3/2}$ units, the combination of $R_2SiO$, $RSiO_{3/2}$ and $SiO4/2$ units, and mixtures containing two or more of these resins, where each R is independently a substituted or unsubstituted monovalent hydrocarbon group, with the proviso that at least one of the R groups represents an alkenyl radical;
   or a mixture thereof.

4. The composition of claim 1, where component (B) comprises: trimethylsiloxy-endblocked polymethylhydrogensiloxane, trimethylsiloxy-endblocked dimethylsiloxane/methylhydrogensiloxane copolymer, trimethylsiloxy-endblocked methylhydrogensiloxane/methylphenylsiloxane copolymer, trimethylsiloxy-endblocked dimethylsiloxane/methylhydrogensiloxane/methylphenylsiloxane copolymer, dimethylhydrogensiloxy-endblocked polydimethylsiloxane, dimethylhydrogensiloxy-endblocked polymethylhydrogensiloxane, dimethylhydrogensiloxy-endblocked dimethylsiloxane/methylhydrogensiloxane copolymer, dimethylhydrogensiloxy-endblocked dimethylsiloxane/methylphenylsiloxane copolymer, dimethylhydrogensiloxy-endblocked polymethylphenylsiloxane, silanol-endblocked polymethylhydrogensiloxane, silanol-endblocked dimethylsiloxane/methylhydrogensiloxane copolymer, silanol-endblocked methylhydrogensiloxane/methylphenylsiloxane copolymer, or silanol-endblocked dimethylsiloxane/methylhydrogensiloxane/methylphenylsiloxane copolymer.

5. The composition of claim 1, where component (B) comprises:

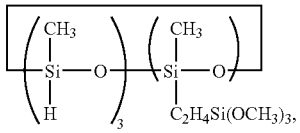

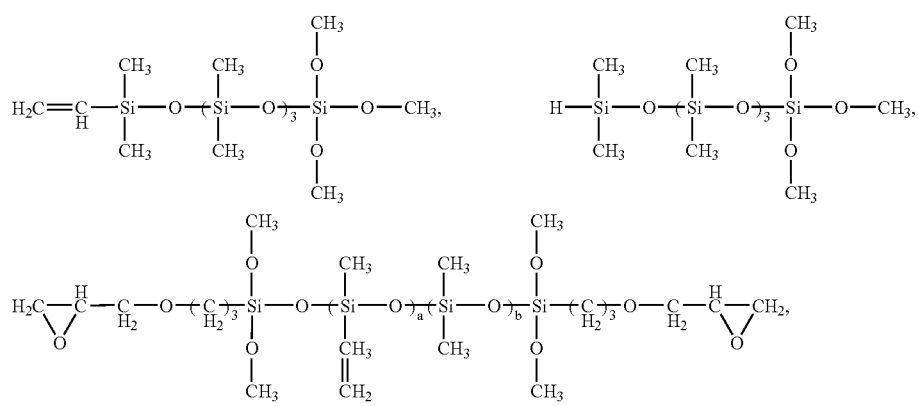

where a and b are each integers with values of at least 1

-continued

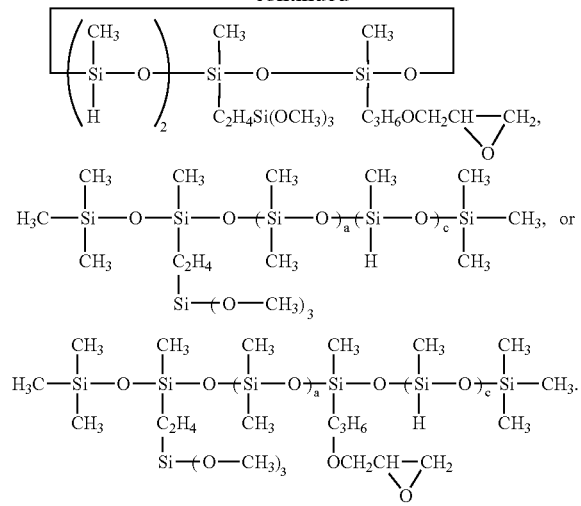

where a represents an integer with a value of at least 1 and c represents an integer with a value of at least 2.

6. The composition of claim 1, where ingredient (D) comprises: platinum black, platinum supported on powdered alumina, platinum supported on powdered silica, platinum supported on powdered carbon, chloroplatinic acid, an alcohol solution of chloroplatinic acid, a chloroplatinic acid/olefin complex, a chloroplatinic acid/vinylsiloxane complex, or a platinum catalyst dispersed in a microparticulate form of thermoplastic organic resin.

7. The composition of claim 4, where ingredient (E) comprises: an alkoxysilane or an organosilicon compound; where the alkoxysilane is selected from the group consisting of tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltrimethoxysilane, allyltrimethoxysilane, allyltriethoxysilane, 3-glycidoxypropyltrimethoxysilane, and 3-methacryloxypropyltrimethoxysilane; and the organosilicon compound is selected from the group consisting of

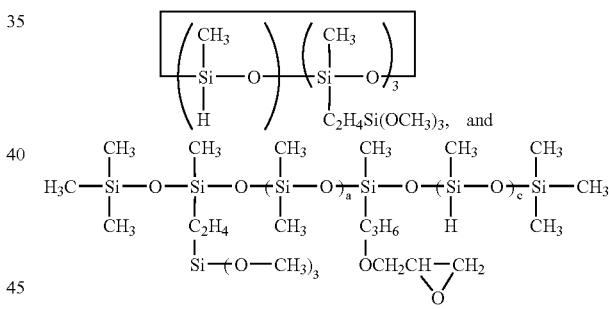

where a is an integer with a value of at least 1 and c is 0 or 1.

8. The composition of claim 5, where ingredient (E) comprises an organosilicon compound that contains silicon-bonded alkoxy groups and either 1 or no silicon-bonded hydrogen atoms.

9. The composition of claim 1, where ingredient (F) comprises an alkynyl alcohol, an ene-yne compound, 1,3,5,7-tetramethyl-1,3,5,7-tetravinylcyclotetra-siloxane, 1,3,5,7-tetramethyl-1,3,5,7-tetrahexenylcyclotetra-siloxane, or benzotriazole.

10. The composition of claim 1 further comprising: an inorganic filter selected from the group consisting of fumed silica, crystalline silica, calcined silica, wet-process silica, fumed titanium oxide, carbon black; and the inorganic filler whose surface has been treated with an organosilicon compound selected from the group consisting of an organoalkoxysilane, organochlorosilane, and an organodisilazane.

11. A method comprising: coating the composition of claim 1 on a surface of a circuit board.

* * * * *